(12) United States Patent
Shimizu et al.

(10) Patent No.: US 6,546,320 B2
(45) Date of Patent: Apr. 8, 2003

(54) CONTROL APPARATUS FOR HYBRID VEHICLE

(75) Inventors: Michinori Shimizu, Hamamatsu (JP); Kazuhiko Morimoto, Hamatsu (JP)

(73) Assignee: Suzuki Motor Corporation, Hamamtsu (JP)

( * ) Notice: Subject to any disclaimer, the term of this patent is extended or adjusted under 35 U.S.C. 154(b) by 0 days.

(21) Appl. No.: 09/873,513

(22) Filed: Jun. 4, 2001

(65) Prior Publication Data

US 2001/0049571 A1 Dec. 6, 2001

(30) Foreign Application Priority Data

Jun. 6, 2000 (JP) ........................................ 2000-168778

(51) Int. Cl.$^7$ ............................. G60L 11/00; G05D 1/00
(52) U.S. Cl. ....................... 701/22; 180/65.1; 180/65.3; 180/65.4; 318/153; 320/128; 290/40 C
(58) Field of Search ............................. 701/22; 180/165, 180/54.1, 65.1, 65.3, 65.4, 65.5, 65.8; 320/130, 132, 128, 138, 139, 140; 318/139, 140, 141, 151, 153, 152; 290/40 A, 40 C, 40 R, 38 R, 45, 50, 51, 47, 48; 123/142.5 R, 142.5 E; 477/3, 7

(56) References Cited

U.S. PATENT DOCUMENTS

| | | |
|---|---|---|
| 4,786,164 A | 11/1988 | Kawata |
| 5,197,562 A | 3/1993 | Kakinami et al. |
| 5,349,520 A | 9/1994 | Hickman |
| 5,839,533 A | 11/1998 | Mikami et al. ........... 290/40 C |

(List continued on next page.)

FOREIGN PATENT DOCUMENTS

| | | |
|---|---|---|
| DE | 41 33 882 | 4/1992 |
| DE | 43 41 689 | 6/1994 |

(List continued on next page.)

OTHER PUBLICATIONS

Patent Abstracts of Japan, vol. 1997, No. 12, Dec. 25, 1997 & JP 09 207609 A (Fujitsu Ten Ltd) Aug. 12, 1997.

Winner et al., "Adaptive Cruise Control—System and Aspects and Development Trends", SAE Technical Papers, Series No. 961010, Feb. 26–29, 1996.

*Primary Examiner*—Jacques H. Louis-Jacques
(74) *Attorney, Agent, or Firm*—Flynn, Thiel, Boutell & Tanis, P.C.

(57) ABSTRACT

A hybrid vehicle includes a control apparatus having an engine controller and a motor controller. A first battery and a second battery which has higher voltage than the first battery are provided. An electric power generator which is driven by the engine is provided for charging the first battery. The second battery and the electric motor are connected through the motor controller, and the first battery or the electric power generator is connected to the motor controller and the engine controller. In addition, the first battery or the electric power generator is connected to the engine controller for maintaining a power supply for operation maintenance of the engine controller. The second battery and the electric motor are connected through the motor controller. The second battery or the electric motor is connected to the motor controller through a DC/DC converter. As a result, even if the high voltage line including the electric motor in the control apparatus for the hybrid vehicle has failed, this system can drive the vehicle.

6 Claims, 3 Drawing Sheets

U.S. PATENT DOCUMENTS

| | | | |
|---|---|---|---|
| 5,841,201 A | 11/1998 | Tabata et al. | 290/40 C |
| 5,895,333 A | 4/1999 | Mikami et al. | 475/5 |
| 5,935,040 A | 8/1999 | Tabata et al. | 477/3 |
| 6,004,922 A * | 12/1999 | Watson et al. | 510/475 |
| 6,057,671 A * | 5/2000 | Kuno | 320/130 |
| 6,109,237 A | 8/2000 | Pels et al. | 123/339.19 |
| 6,114,775 A | 9/2000 | Chung et al. | 307/10.1 |
| 6,137,250 A | 10/2000 | Hirano et al. | 318/376 |
| 6,225,784 B1 * | 5/2001 | Kinoshita et al. | 320/130 |
| 6,234,932 B1 | 5/2001 | Kuroda et al. | 477/3 |
| 6,252,377 B1 * | 6/2001 | Shibutani et al. | 320/132 |
| 6,334,079 B1 * | 12/2001 | Matsubara et al. | 180/65.1 |
| 6,335,574 B1 | 1/2002 | Ochiai et al. | 290/40 C |
| 6,345,216 B1 | 2/2002 | Morimoto et al. | 701/27 |
| 6,348,771 B1 | 2/2002 | Morimoto et al. | 318/139 |
| 6,362,580 B1 | 3/2002 | Omata et al. | 318/139 |
| 6,382,335 B2 * | 5/2002 | Takashima et al. | 123/198 DB |
| 2001/0028171 A1 | 10/2001 | Omata et al. | 290/40 C |
| 2001/0028233 A1 | 10/2001 | Omata et al. | 318/445 |
| 2002/0020571 A1 | 2/2002 | Morimoto et al. | 180/65.3 |
| 2002/0021007 A1 | 2/2002 | Morimoto et al. | 290/40 C |

FOREIGN PATENT DOCUMENTS

| | | |
|---|---|---|
| DE | 196 14 061 | 10/1996 |
| DE | 197 22 947 | 2/1999 |
| EP | 0 460 850 | 12/1991 |
| JP | 7-115704 | 5/1995 |
| JP | 8-98318 | 4/1996 |
| JP | 9-56007 | 2/1997 |
| JP | 10-174201 | 6/1998 |

* cited by examiner

CONTROL APPARATUS FOR HYBRID VEHICLE

FIELD OF THE INVENTION

This invention relates to a control apparatus for a hybrid vehicle for enabling driving of a vehicle, even if a high voltage line including a electric motor has failed.

BACKGROUND OF THE INVENTION

Some motor vehicles are of a type commonly called a hybrid vehicle having an internal combustion engine and an electric motor disposed therein as the power sources of a propulsion system. The hybrid vehicle further includes an engine control means for controlling a running state of the engine and motor control means for controlling an operating state of the motor. The engine control means and the motor control means detect respective operating states of the engine and the electric motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and power performance).

Such examples of a control apparatus for a hybrid vehicle are disclosed in published Japanese Application Laid-Open Nos. 7-115704, 8-98318, 9-56007 and 10-174201.

However, in a retarder apparatus disclosed in published Japanese Application Laid-Open No. 7-115704, a countermeasure when motor (12), and controller (34), and rising voltage chopper rectifying circuit (32) have broken down or failed, is not mentioned.

In a control method of a hybrid type electric vehicle disclosed in published Japanese Application Laid-Open No. 8-98318, a motor (18) for traveling only becomes in an usable state. Therefore, an engine is not a drive source for traveling, and drives an electric power generator. Accordingly, in such structure of a vehicle, when motor (18), battery for traveling (20) and EV-ECU (26) have broken down or failed, then the vehicle becomes unable to travel.

In a hybrid vehicle disclosed in published Japanese Application Laid-Open No. 9-56007, a low voltage line of 12V (24V) and a high voltage line of 36 to 228V are independent. However, a method for start-up of an engine and a countermeasure when a controlling power supply (low voltage) to inverter (30) and high voltage line have broken down, are not mentioned.

A power-supply unit for a supplementary apparatus of a hybrid electric vehicle disclosed in published Japanese Application Laid-Open No. 10-174201 is similar to that of above-mentioned Japanese Application Laid-Open No. 8-98318.

Incidentally, in a control unit of a traditional hybrid vehicle, the usual power supply of 12V is made from high voltage (150 to 300V) battery for motor by a DC/DC converter. Accordingly, a low voltage battery of 12V is possessed, but, an alternator that is an electric power generator is not equipped. Thus, because a high voltage battery is main, when the high voltage battery is down, a function of the vehicle will be stopped.

Further, in order to function properly without a high voltage battery going low, an expensive battery consisting of a nickel/hydrogen battery or a lithium ion battery is necessary. Then a complicated battery administrating function becomes necessary, and there is inconvenience and the system is disadvantageous in practical use.

SUMMARY OF THE INVENTION

In order to obviate or minimize the above inconvenience, the present invention provides a control apparatus for a hybrid vehicle mounted with an engine and an electric motor which is connected to an output shaft of the engine. The control apparatus includes an engine controller which controls a running state of the engine. A motor controller controls a driving state of the electric motor independently from control of the engine by the engine controller. A first battery and a second battery which has a higher voltage than the first battery are provided. An electric power generator driven by the engine is provided for charging the first battery. The second battery and the electric motor are connected through the motor controller. The first battery or the electric power generator is connected to the motor controller for maintaining a power supply for operation maintenance of the motor controller and is connected to the engine controller for maintaining a power supply for operation maintenance of the engine controller.

In addition, the present invention provides a control apparatus for a hybrid vehicle wherein the first battery or the electric power generator is connected to the engine controller for maintaining a power supply for operation maintenance of the engine controller. The second battery or the electric motor is connected to the motor controller through a DC/DC converter for maintaining a power supply for operation maintenance of the motor controller.

According to the present invention as previously described, in a control apparatus for a hybrid vehicle, because a first battery or electric power generator is connected to a motor controller and engine controller, even if a high voltage line including an electric motor has broken down, such a hybrid vehicle can run using the engine only.

Moreover, in a control apparatus for a hybrid vehicle, the first battery or electric power generator is connected to an engine controller. A second battery and electric motor are connected to a motor controller through a DC/DC converter. Accordingly, the engine controller side that is a low voltage system including the engine and the motor controller side that is a high voltage system including the electric motor are completely independent. Even if it is assumed that the motor controller side that is a high voltage system has failed, this system receives no influence, and such a vehicle can be driven by only the engine controller side which is a low voltage system.

DETAILED DESCRIPTION OF THE INVENTION

Figure 1:
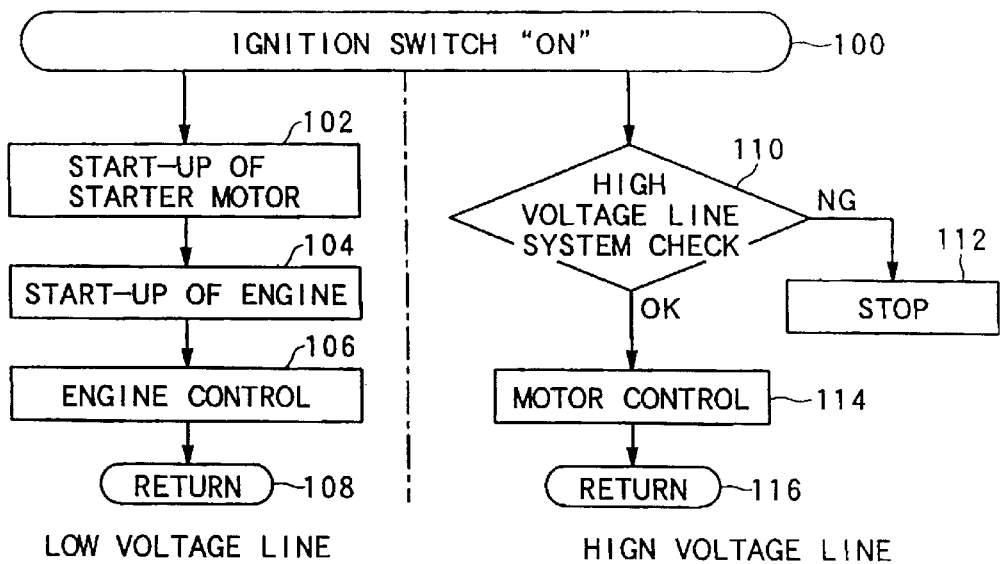
FIG. 1 is a control flowchart of a control apparatus for a hybrid vehicle showing a first embodiment of the present invention.
Figure 2:
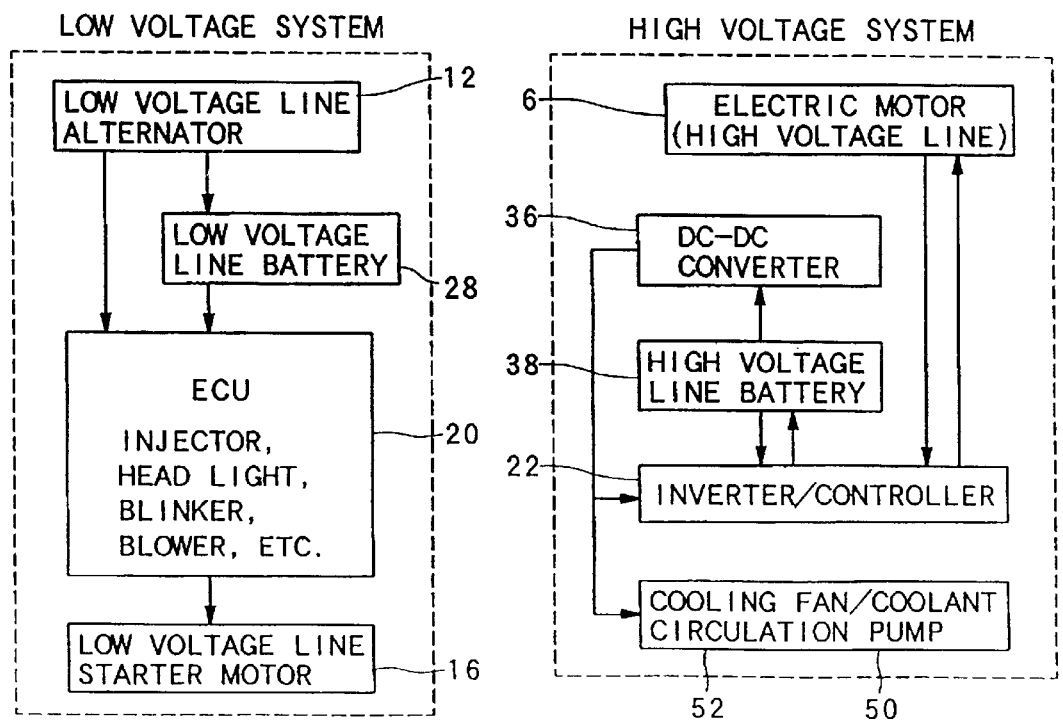
FIG. 2 is a block diagram showing a control apparatus for a hybrid vehicle.
Figure 3:
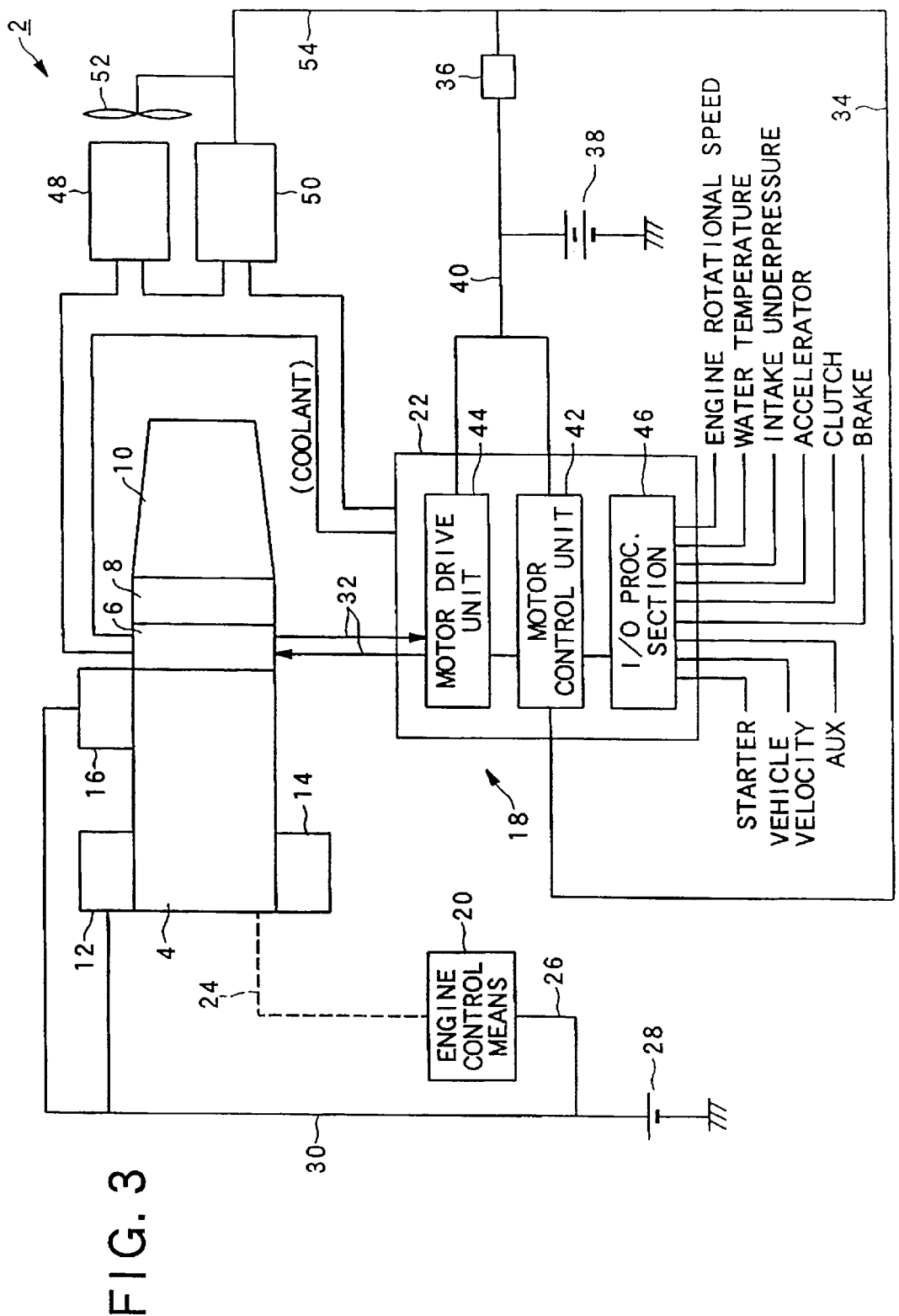
FIG. 3 is a block diagram showing a control system of a hybrid vehicle.

The present invention will now be described in specific detail with reference to FIGS. 1–3 illustrating an embodiment of this invention. FIG. 3, shows a vehicle-propelling system 2 for a hybrid vehicle (not shown) including an engine 4, an electric motor 6, a clutch 8, and a transmission 10. In the hybrid vehicle, the engine 4 and the motor 6 having both driving and power-generating functions and connected to an output shaft (not shown) of the engine 4, are disposed in the vehicle as the vehicle-propelling system 2.

In the vehicle, for example, the electric motor 6 is directly connected to the engine 4. The manual transmission 10 is directly connected to the electric motor 6 through the clutch 8. Further, the engine 4 is provided with an alternator 12, an air-conditioner (A/C) compressor 14 and a starter motor 16.

The electric motor 6 is positioned between the engine 4 and the manually operated transmission 10. In addition, the electric motor 6 includes a stator coil and a rotor such as a flywheel (not shown).

The vehicle-propulsion system 2 includes engine control means 20 and motor control means 22 as control means 18. The engine control means 20 controls a running state of the engine 4, while the motor control means 22 ("inverter/controller") controls both driving and power-generating states of the electric motor 6.

The engine 4 is connected to the engine control means 20 through an engine-controlling signal line 24. "Line" is used herein to describe any electrical signal conduit. The engine control means 20 is linked to a first battery 28 through an engine control means-dedicated power line 26. This first battery 28 is a driving power supply for engine control and supplementary apparatus such as lamps, a blower and the like. The first battery 28 is a conventional 12-volt vehicle battery. The first battery 28 is coupled to the alternator 12 and the starter motor 16 through a first battery-charging power line 30. The alternator 12 charges the first battery 28 and supplies electricity to a consumption apparatus.

The electric motor 6 is connected to the motor control means 22 through a motor-controlling signal line 32. The motor control means 22 is linked to a second battery 38 that is a higher voltage than the first battery 28, through a motor control means-dedicated sub-power line 34 and a DC/DC converter 36. The motor control means 22 is also coupled to the second battery 38 through a motor control means-dedicated main power line 40. The second battery 38 supplies driving electric power to the electric motor 6 and is charged by generated electric power from the electric motor 6.

The motor controller or motor control means 22 is connected at the input side in order to receive the following signals: a starter signal; a vehicle velocity signal; an engine rotational speed signal; a water temperature signal; an intake negative pressure signal; an accelerator state signal; a clutch state signal and a brake state signal.

The motor control means 22 includes a motor control unit 42 that is a control circuit, a motor drive unit 44 that is a drive circuit and an input/output-processing section (interface) 46.

Moreover, a cooling sub-radiator 48 connected to the electric motor 6 is driven under the control of the motor control means 22. In addition, a coolant circulation pump 50 for supplying a cooling water to the electric motor 6 and engine 4 connects to the sub-radiator 48. Incidentally, a cooling fan 52 is arranged near the cooling sub-radiator 46 and is connected to DC/DC converter 36. A power line 54 connects the coolant circulation pump 50 and cooling fan 52 to the DC/DC converter 36. The motor control means 22 is linked at an output side to the electric motor 6.

The control apparatus 18 of the vehicle-propelling system 2 includes both the engine control means 20 and the motor control means 22. The engine control means 20 controls an operating state of the engine 4, while the motor control means 22 controls both driving and battery charging power-generating states of the electric motor 6. More specifically, the motor control means 22 does not exchange data with the engine control means 20, is independent from the control of the engine 4 by the engine control means 20 and independently determines and controls the drive state and the battery charging power generation state of the electric motor 6.

In order to maintain a power supply for operation maintenance of the engine control means 20, the first battery 28 or the alternator 12 that is an electric power generator is connected to the engine control means 20, and the second battery 38 and the electric motor 6 are connected through the motor control means 22. In addition, in order to maintain a power supply for operation maintenance of the motor control means 22, the second battery 38 or the electric motor 6 is connected to the motor control means 22 through the DC/DC converter 36.

Specifically, in the control apparatus 18, as shown in FIG. 2, engine control means 20 having a side with a low voltage system and motor control means 22 having a side with a high voltage system are completely independent from each other.

Then, the engine control means side with a low voltage system, as shown in FIG. 2, includes alternator 12, starter motor 16, first battery 28 and engine control means 20.

In addition, the motor drive means side is a high voltage system, as shown in FIG. 2, and includes electric motor 6, motor drive means 22, DC/DC converter 36, second high voltage battery 38, coolant circulation pump 50 and cooling fan 52.

Operation of the embodiment will now be described with reference to a control flowchart in FIG. 1 for use in the control apparatus 18.

Referring now to FIG. 1, when a controlling program starts control at step 100 by "ON" operation of ignition switch, in low voltage line, starter motor 16 starts up at step 102. Thereafter, engine 4 starts up at step 104.

After engine start processing in step 104, engine control is executed at step 106 by engine control means 20, and the routine is returned to step 108.

In addition, when a controlling program starts control at step 100 by "ON" operation of an ignition switch, in a high voltage line, checking of the high voltage line system is executed at step 110.

When the check in step 110 results in "NG", then the routine is returned to "STOP" for stopping control operation in step 112. When the check in step 110 is "OK", then motor control is executed by motor control means 22, and the routine is returned to step 116.

Thus, by control apparatus 18 of the hybrid vehicle, the engine control means side that is a low voltage system including engine 4 and motor drive means side that is a high voltage system including electric motor 6 are completely independent. Even if it is assumed that the motor drive means side that has a high voltage system has failed, the low voltage system receives no influence. Accordingly, because a vehicle can be driven by the engine control means 20 side only, which is a low voltage system, it is advantageous in practical use.

Further, because starter motor 16 for starting up the engine 4 depends on power supply of the low voltage line only, even if the high voltage series arrangement breaks down, there is no problem for starting-up performance of the engine. Therefore, this system can maintain good starting-up performance.

Figure 4:
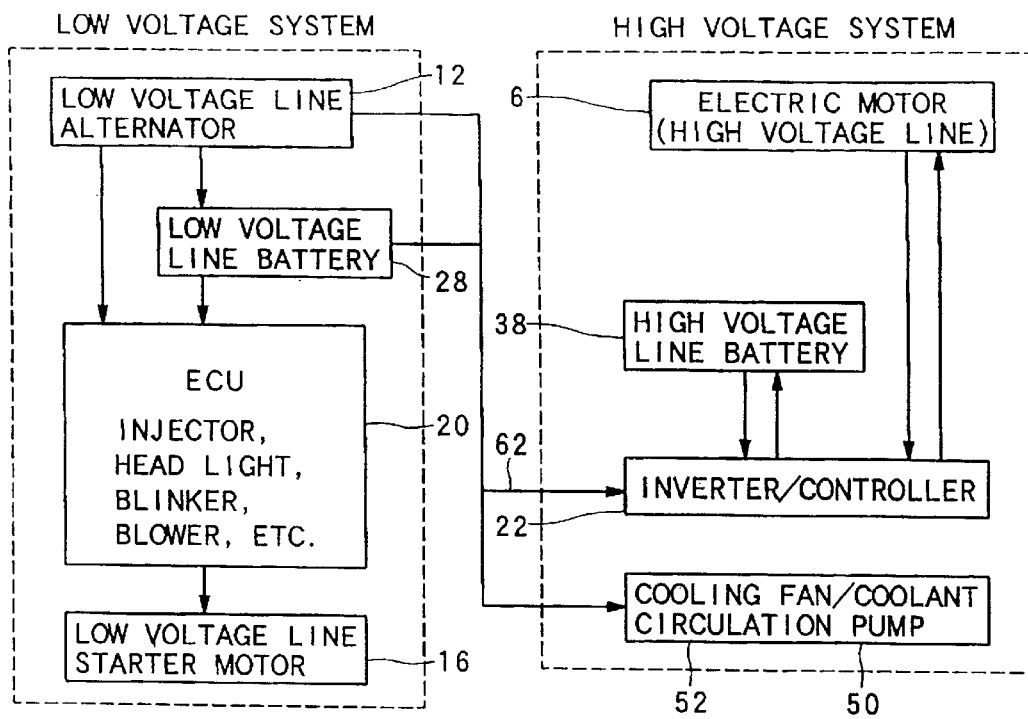
FIG. 4 is a block diagram showing a control apparatus for a hybrid vehicle in a second embodiment of the present invention.

FIG. 4 shows the second embodiment of this invention. In this second embodiment, when a part functions the same as that of the first embodiment, the same reference numeral as that of the first embodiment is assigned.

This second embodiment is characterized by the system having the first low voltage line battery 28 connected to and maintaining a power supply for operation maintenance of the motor control means 22. The alternator 12 that is an electric power generator is also connected to motor control means 22, and to the first battery 28 for maintaining a power supply for operation maintenance of the engine control means 20. Thus, the first battery 28 or the alternator 12 that is an electric power generator, provide power to the engine control means 20.

In other words, the engine control means side has a low voltage system, as shown in FIG. 4, including alternator 12, starter motor 16, first low voltage line battery 28 and engine control means 20. The motor drive means side has a high voltage system, as shown in FIG. 4, including electric motor 6, motor drive means 22 that is an inverter/controller, second high voltage line battery 38, coolant circulation pump 50 and cooling fan 52.

The first battery 28 or alternator 12, as shown in FIG. 4, is connected to the motor control means 22 through power line 62. Accordingly, even if the high voltage line including electric motor 6 has broken down, the hybrid vehicle can operate using engine 4 only, which is advantageous in practical use. In addition, because electric products such as coolant circulation pump 50, cooling fan 52 and the like mounted in a hybrid vehicle are supplied electric power from first battery 28 or alternator 12, the hybrid vehicle can be used without the slightest problem when motor 6 has failed.

This system is simply composed to add the high voltage system including electric motor 6 to a vehicle which mounts with a general engine. Accordingly, this system is easy to mount on an existing vehicle, is easy to produce, and is relatively inexpensive.

Further, in this system, it is not necessary to provide electric power from the high voltage line to the low voltage line, and the DC/DC converter is unnecessary. As a result, simplification of the system can be planned, additional space results and the number of parts may be decreased.

Furthermore, because starter motor 16 for starting up the engine 4 depends on power supply from the low voltage line only, even if, for example a high voltage series line breaks down, there is no problem for starting-up performance of the engine. Therefore, this system is advantageous in practical use.

Figure 5:
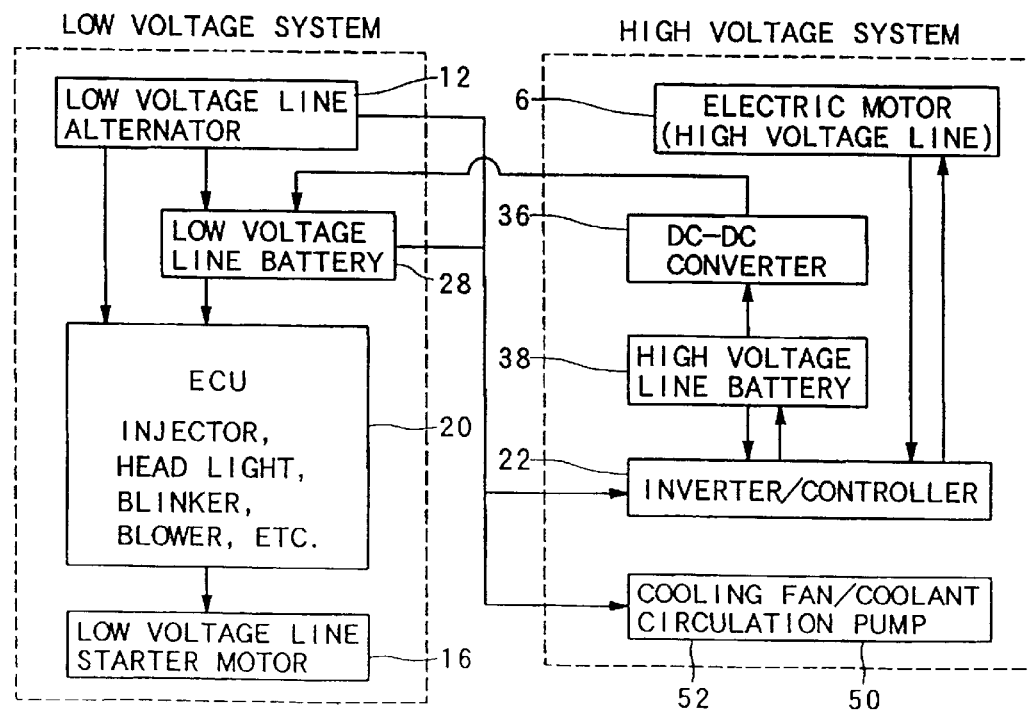
FIG. 5 is a block diagram showing a control apparatus for a hybrid vehicle in a third embodiment of the present invention.

FIG. 5 shows the third embodiment of this invention. This third embodiment is characterized by the system connecting first low voltage line battery 28 to second high voltage line battery 38 through DC/DC converter 36.

In other words, an engine control means side has a low voltage system, as shown in FIG. 5, including alternator 12, starter motor 16, first low voltage battery 28 and engine control means 20. A motor drive means side has a high voltage system, as shown in FIG. 5, including electric motor 6, motor drive means 22 that is an inverter/controller, DC/DC converter 36, second high voltage line battery 38, coolant circulation pump 50 and cooling fan 52.

The first battery 28, as shown in FIG. 5, is connected to second battery 38 through power line 72 and DC/DC converter 36. Accordingly, it is possible for this system to supply electric power from the second battery 38 to the first battery 28. But, because the first battery 28 is supplied electric power from alternator 12 of the low voltage line, even if the second battery 38 and DC/DC converter 36 has broken down, the low voltage line system does not break down. As a result, this system is advantageous in practical use.

In addition, because redundant electric power by recharged electricity can be supplied in the first battery 28, this system can contribute to effective practical use of electricity.

Furthermore, this invention is not limited to the above-mentioned first-to-third embodiments, but is suitable to many possible innovations and applications. For example, the first embodiment of this invention is composed by a following control means: an electric circuit between both the engine control means side to control a driving state of the engine 4 and the motor control means side to control a drive state of the motor 6 which is not linked in order to let the motor control means be independent from the engine control means. However, the following special control means may be composed. The electric circuit between both the engine control means side and the motor control means side may be linked by equipping a switching-over mechanism in order to execute both usual control means. The engine control means and motor control means linked in the first embodiment of this invention.

Specifically, the usual system can get remarkable attendant advantage by a use state. In order to effectively utilize such the use state, a manual switching-over switch is equipped, and this switch switches over the system in accordance with a first embodiment of this invention to the usual system. Thus, by switching over these systems according to circumstances, a good point in each system can be utilized.

Incidentally, the switching-over switch, besides being manually an operated switch, may be controlled to automatically switch over in accordance with a state of the hybrid vehicle determined by a computer, so as to become a best state for the hybrid vehicle.

As amplified in the above-mentioned description, the present invention provides a control apparatus for a hybrid vehicle having an engine and a motor disposed therein as a vehicle-propelling system. The motor is connected to an output shaft and has both driving and power-generating functions. The control apparatus includes an engine control means which controls a running state of the engine, and a motor control means which controls both driving and recharging power-generating states of the motor independently from the control of the engine by the engine control means.

The engine control means side is a low voltage system including the engine. The motor control means side is a high voltage system including the electric motor. The two sides are completely independent in the control apparatus for a hybrid vehicle. Even if it is assumed in the motor drive means side that a high voltage system has broken down, this system receives no influence. As such, the vehicle can be driven by an engine control means side only that is a low voltage system. As a result, this system is advantageous in practical use.

What is claimed is:

1. A control apparatus for a hybrid vehicle mounted with an internal combustion engine and an electric motor connected to an output shaft of said engine, comprising:

an engine controller which controls a running state of said engine; and a motor controller which controls a driving state of said electric motor independent from control of said engine by said engine controller; the vehicle including a first battery and a second battery having a higher voltage than the first battery, and an electric power generator which is driven by said internal combustion engine for charging said first battery, said second battery and said electric motor being connected through said motor controller so that said second battery is charged by said electric motor, the vehicle including a starter powered by said first battery and controlled by said engine controller, wherein at least one of said first battery and said electric power generator is connected to said motor controller for maintaining a power supply for operation maintenance of said motor controller and is connected to said engine controller for maintaining a power supply for operation maintenance of said engine controller.

2. The control apparatus for a hybrid vehicle of claim 1, wherein said first battery is connected to said second battery through a DC/DC converter enabling said second battery to supply power to said first battery.

3. A control apparatus for a hybrid vehicle mounted with an internal combustion engine and an electric motor connected to an output shaft of said engine, comprising:

an engine controller which controls a running state of said engine; and a motor controller which controls a driving state of said electric motor independent from control of said engine by said engine controller; the vehicle including a first battery and a second battery having a higher voltage than the first battery, said first battery and said second battery being unconnected; and an electric power generator which is driven by said engine for charging said first battery, wherein said first battery or said electric power generator are connected to said engine controller for maintaining a power supply for operation maintenance of said engine controller, and said second battery and said electric motor are connected through said motor controller, and said second battery or said electric motor connects to said motor controller to maintain a power supply for operation maintenance of said motor controller.

4. The control apparatus for a hybrid vehicle of claim 3, wherein maintaining operation maintenance of said motor controller includes having said second battery provide power to a cooling fan and a coolant circulation pump.

5. A hybrid vehicle comprising:

an internal combustion engine having an output shaft;

an engine controller for controlling a running state of said internal combustion engine;

an electric motor connected to the output shaft of said engine;

a motor controller for controlling a driving state of said electric motor independent from control of said engine by said engine controller;

a main battery for providing power to said engine controller;

an alternator for receiving power from said internal combustion engine and providing power to said main battery and said engine controller; and a high-voltage battery for providing power to and receiving power from said electric motor, wherein at least one of said main battery and said alternator is connected to said motor controller for maintaining a power supply for operation of said motor controller so that failure of said electric motor or said motor controller does not affect operation of said hybrid vehicle.

6. The hybrid vehicle of claim 5, including a DC/DC converter connecting said high-voltage battery and said main battery, enabling said high-voltage battery to supply power to said main battery.

* * * * *